Jan. 17, 1939.  C. C. HALL  2,144,054
FEED FORMING MACHINE
Filed July 3, 1936  5 Sheets-Sheet 1

INVENTOR
Claude C. Hall
BY Samuel S. Jacobson
ATTORNEY

Jan. 17, 1939.   C. C. HALL   2,144,054
FEED FORMING MACHINE
Filed July 3, 1936   5 Sheets-Sheet 2

INVENTOR
Claude C. Hall
BY
Samuel J. Jacobson
ATTORNEY

Jan. 17, 1939.　　　C. C. HALL　　　2,144,054
FEED FORMING MACHINE
Filed July 3, 1936　　　5 Sheets-Sheet 3

INVENTOR
Claude C. Hall
BY
ATTORNEY

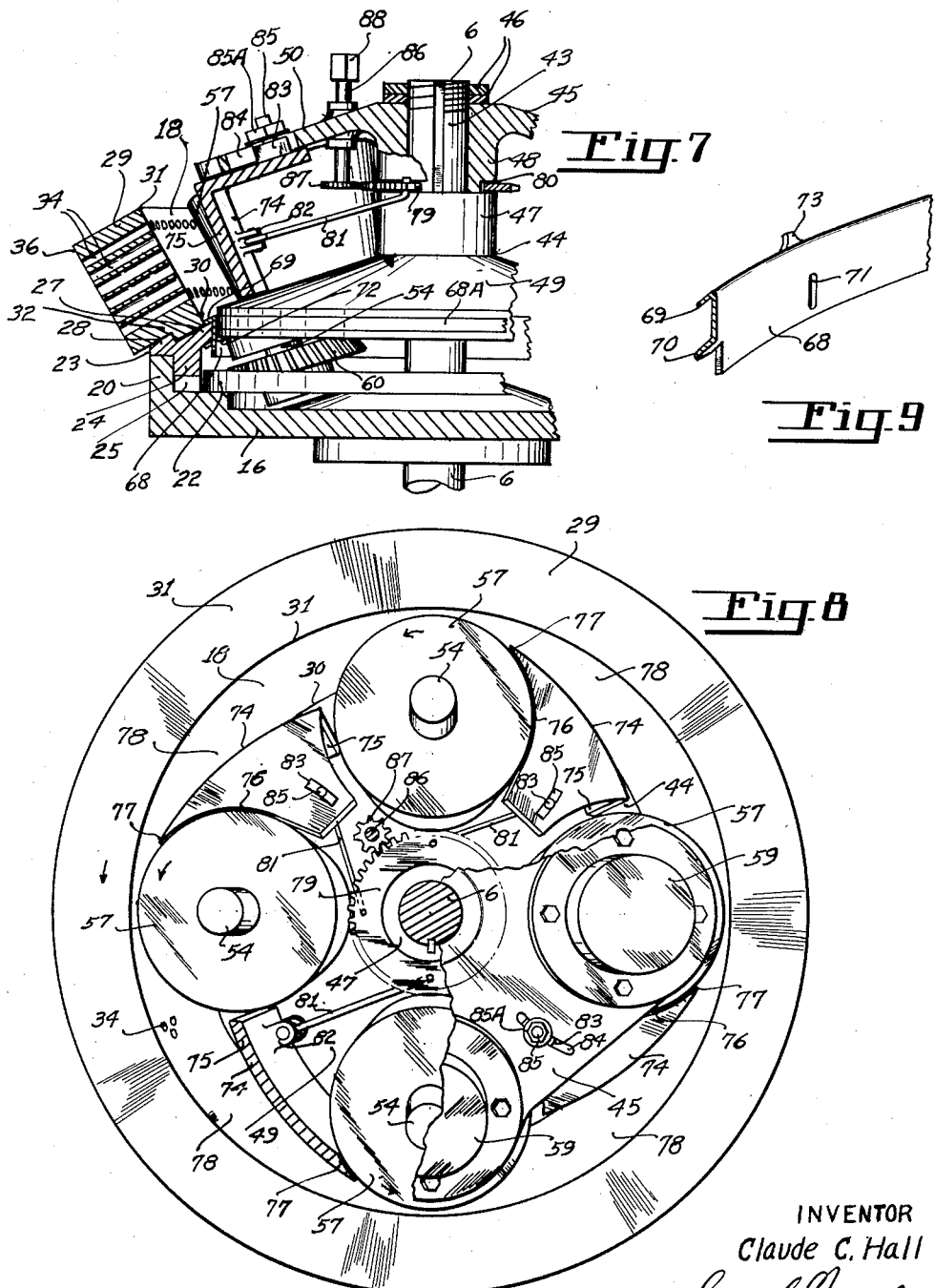

INVENTOR
Claude C. Hall
Samuel S. Jacobson
ATTORNEY

Patented Jan. 17, 1939

2,144,054

UNITED STATES PATENT OFFICE 2,144,054

FEED FORMING MACHINE

Claude C. Hall, Portland, Oreg.

Application July 3, 1936, Serial No. 88,766

18 Claims. (Cl. 107—8)

Broadly, this invention relates to machines which continuously act upon plastic, semi-plastic or other conglomerate masses and forms therefrom compressed and molded feed products of predetermined texture, density and length, but it is specifically directed to a feed forming machine of the press type having a revolving tapered die member, a plurality of rotating rollers, the rotation of the die and rollers being correlated so that, when there is fed into the machine a conglomerate mass upon which the rollers and die operate, no slippage will occur between the respective peripheral surfaces of the die and rollers. There is, also, provided a plurality of stationary stripping members which are positioned with respect to the outside face of the die, so that the extruded molded material may be immediately removed from the face of the die.

A salient feature of the invention is to provide a feed forming machine having a revolving tapered die member and a plurality of rotating rollers secured to a stationary member capable of resisting the pressure created by the compression and extrusion of the conglomerate mass through the die by the action of the rollers in the forming of pellets or like products from the conglomerate mass.

One of the leading ideas in connection with the invention is to provide means for simultaneously adjusting the position of each of the feeder shoes with respect to the inner face of the tapered die member.

An equally important object of the invention is to provide means for vertically adjusting the tapered die member with respect to the rollers.

Another object of the invention is to provide an adjustable tapered die and a plurality of tapered rollers conjointly engaging the conglomerate mass between the respective peripheral surfaces without slippage occurring between said surfaces, regardless of the raising or lowering of the die, since the ratio between the peripheral surfaces of the die and the rollers remains the same.

Another object of the invention is to provide means for revolving the tapered die member and means for rotating each of the rollers.

The invention, also, contemplates the provision of means for equally distributing and feeding a conglomerate mass into the machine, so that a uniform amount of the material to be processed will be delivered between the tapered die member and the rollers.

A further object of the invention is to provide a machine, the parts of which require relatively little adjustment, which is durable in construction, so simple in operation that it requires little attention, and which requires little power for its effective operation.

The invention is directed to other objects and possesses other features of novelty all of which will become readily apparent as the following detailed description is unfolded. In the accompanying drawings, forming a part of the specification, wherein, for the purpose of illustration, there is shown the preferred embodiment of my invention, and in which like reference characters are employed to designate corresponding parts throughout the several views:

Figure 7 is a fragmentary, sectional, side view of the upper portion of the machine, taken on line 7—7 of Figure 5, looking in the direction indicated, showing the details of construction not graphically disclosed in Figure 2.

Figure 8 is a top view with the top member partially broken away, taken on line 8—8 of Figure 2 looking in the direction indicated showing some of the rollers and graphically illustrating the means for the simultaneous adjustment of the feeder shoes.

Figure 9 is a fragmentary, perspective, front view of the sealing ring, which is operatively connected to the die supporting member, showing the details of its construction.

Figure 1:
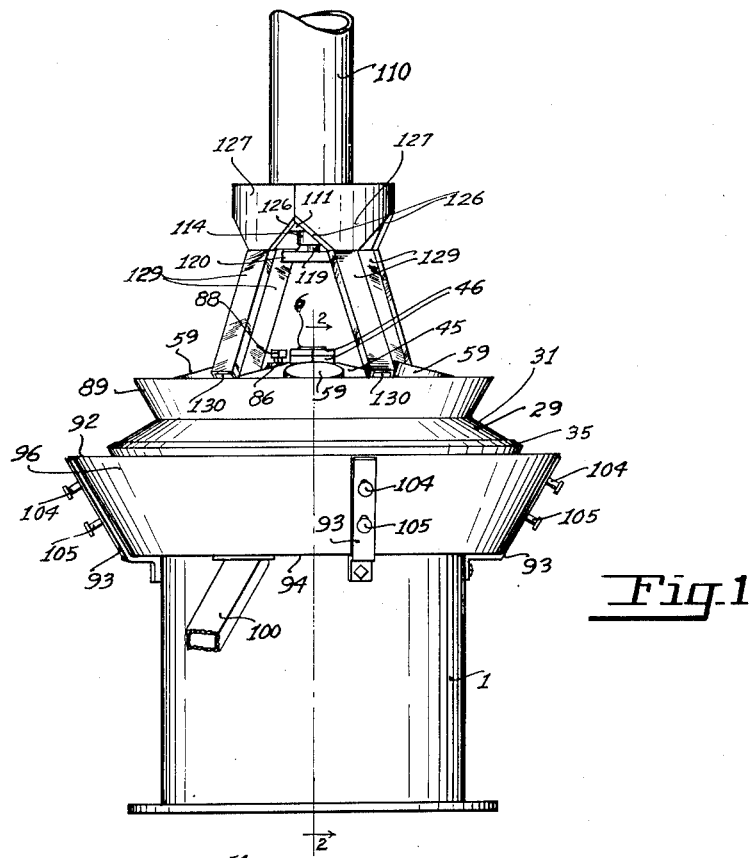
Figure 1 is an elevational view of a machine embodying the principles of my invention and showing in association therewith, the feed dividing member used to evenly divide the conglomerate mass before it is delivered into the machine.

A frame 1 of conventional contour and design is shown in Figure 1. A cross section of the frame, shown in Figure 2, reveals a prime mover 2 secured to the inside wall of the frame in any satisfactory manner. A supporting spider 3 is fixedly secured to, or it may be made an integral part of, frame 1. The supporting spider 3 is positioned slightly below the top 4 of the frame. A hub 5, having a tapered bore, is disposed centrally of the supporting spider 3, and shaft 6, having a tapered lower end 7, partly threaded, is fixedly secured in vertical position to the supporting spider in any desirable manner with its tapered lower end 7 intimately fitting into the tapered bore of the hub 5 of the supporting spider. A heavy duty roller bearing 9 is secured to the shaft 6 immediately above the supporting spider.

A bearing 10 is shown supported by the frame 1, although it may be disposed between two spokes of the supporting spider 3, and itself supports shaft 11. Secured to shaft 11 of the prime mover 2 is a small pinion gear 13 and in meshing relation with said pinion gear is an enlarged pinion gear 14 that is secured to one end of shaft 11. Still another pinion gear 15 is secured to the other end of shaft 11 and is located with respect to the frame so that its top is slightly below the top 4 of the frame. The function of this pinion gear 15 will become apparent as the other elements of the machine are described. The position of the prime mover and the location and type of gearing may be changed, or an entirely different mode of power and speed reduction may be used without in any way affecting the main functions of the invention.

A main supporting block 16 is disposed about shaft 6 and has an annular recess 17 disposed centrally thereof into which the outer race of the roller bearing 9 snugly fits. This arrangement permits the main supporting block 16 to freely rotate about shaft 6 as its axis while its weight is carried by the roller bearing 9. An annular internal gear 19, which extends downwardly from the supporting block 16, may be made a part of or may be removably secured to the supporting block to suit the convenience of manufacture. When the supporting block 16 is disposed about the shaft 6 and positioned upon roller bearing 9, the annular internal gear 19 extends sufficiently into the interior of frame 1 for its teeth to be engaged by and meshed with the teeth of the pinion gear 15. It is by this means that rotation is imparted to the supporting block 16 in order that it may revolve about shaft 6 on roller bearing 9. An annular ledge 20 extends beyond the top surface of the supporting block 16 and may be made as an integral part of the supporting block. The top surface of annular ledge 20 is composed of a plurality of cam surfaces 21 which may best be seen in Figure 3. Not until the die supporting member is described can the function of these cam surfaces 21 be explained. Disposed in spaced relationship with this annular ledge 20 and supported upon or made integral with the top surface of the supporting block 16, is an annular internal bevel gear 22. The function of this internal bevel gear 22 will best be understood, when other elements of the machine are first described.

A die supporting member 23 has an annular ledge 24 extending downwardly therefrom which is positioned within the annular well 25 formed between the ledge 20 and annular internal bevel gear 22. The lower face of the die supporting member 23 has a plurality of cam surfaces 26 which are graphically shown in Figure 3 of the drawings. Cam surfaces 26 are identical in area and complementary in contour to cam surfaces 21 so that, when the die supporting member 23 is placed upon the ledge 20 of supporting block 16, the respective cam surfaces of the ledge 20 and the die supporting member 23 intimately engage in complementary relation. An inclined annular flange 27 extends from the inner periphery of the die supporting member 23. A raised annular portion 28, the top of which is slightly inclined downwardly and possesses the same inclination as the inclined annular flange 27, forms a stepped seat in conjunction with the inclined annular ring upon which the die member to be described forthwith is placed.

The die member is in the form of a ring 29 which is tapered so that its base 30 is smaller than its top 31. The taper of the die ring 29 is such as to provide an inner face 18 which is inclined outwardly when viewed in relation to the shaft 6. The base 30 is formed into a stepped inclined surface 32, the contour of which is complementary to the stepped seat formed by the inclined top of the raised annular portion 28 and the inclined top of the annular flange 27, so that these respective surfaces coincide with each other and provide the means by which the die is held in place against the die supporting member 23 and insures against the normal thrust imparted to it when the machine is in operation. The base 30 of the die 29 extends beyond the outside of the supporting block 16 and the die supporting member 23, as shown at 33. A plurality of passages or perforations 34 are radially disposed through the body of the die 29. These are positioned at right angles to the faces of the die and are disposed in spaced relationship with each other and are shown as round in shape, but it is obvious that the shape, contour and position of the passages may be varied to suit the demands of the trade for feeds of different shape and contour, but such changes in the die itself, if made, would not affect the principles embodied in this invention. A detachable ring collar 35 surrounds a portion of the top 31 and a portion of the outer face 36 of the die and serves to reinforce the die at its top. The die is easily removable, and other dies having a different taper or possessing passages of different size or shape may be substituted when desired without the expenditure of a great deal of time and effort.

Figures 2, 3, 4:
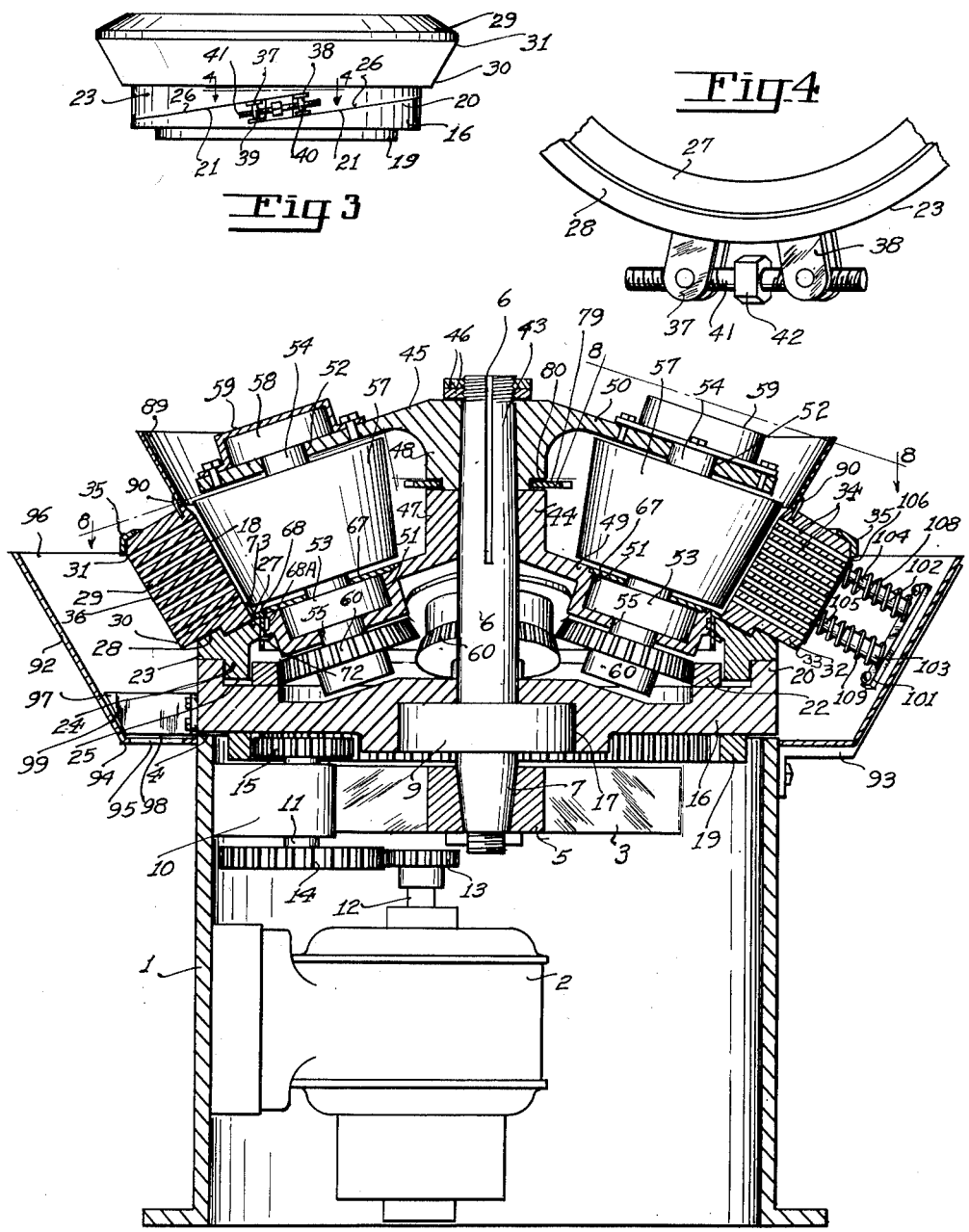
Figure 2 is a sectional, side view of the machine shown in Figure 1, without the feed dividing member, taken on line 2—2 of said figure, looking in the direction indicated.
Figure 3 shows a side view of the die and die support and one of the adjusting devices as they appear removed from the rest of the machine and graphically illustrates the means used to adjust the position of the die.
Figure 4 is a fragmentary, top view of the die support and one of the adjusting devices, taken on line 4—4 of Figure 3 looking in the direction indicated, which points out the constructional details of one of the devices used in raising and lowering the die.

It has been heretofore stated that the die 29 may be raised or lowered, but the means by which this is accomplished has only been pointed out in general terms. The adjusting member is shown in Figures 3 and 4 of the drawings, but the details of construction may best be seen in Figure 4.

A bracket 37 is secured in any conventional manner to the side of the ledge 20. Another bracket 38 is secured to the side of the die supporting member 23. Bracket 37 has a hinged member 39 disposed therein. Hinged member 39 has a threaded opening therethrough. Bracket 38, also, has a hinged member 40 disposed therein, and it, too, has a threaded opening therethrough. An adjusting screw 41 is threadably disposed through hinged members 39 and 40 and possess a right and left thread at its respective ends. A nut 42 is secured to the center of the adjusting screw 41. The raising and lowering of the die with respect to the die supporting member 23 is accomplished by rotating the adjusting screw 41 which, because of its threadable connection with the hinged members 39 and 40, forces the brackets 37 and 38 to be moved in opposite directions from each other. This results in the die supporting member 23, having cam surfaces 26 thereon, to be moved upwardly with respect to the supporting block 16 since the cam 21 formed on said supporting block provides an inclined plane upon which the die supporting member rides. In order to appreciate the necessity for raising and lowering the die 29, it is necessary to first describe other elements of the invention. This will be done forthwith.

It is desirable now to point out that the upper end 43 of shaft 6 is slightly tapered, and it, too, is partly threaded. A pair of roller supporting members 44 and 45 are keyed to the shaft 6 and are, therefore, restrained from rotating about the shaft 6. To further insure against the movement of these members 44 and 45 and to absorb whatever upward thrust that may be imparted to these members during the operation of the machine, there is provided threaded members 46, which are threadably secured about the threaded portion of end 43 of shaft 6. Members 44 and 45 have hubs 47 and 48 respectively, each of which possesses a tapered bore commensurate with the taper of the end 43 of shaft 6. The main body portions of members 44 and 45 are slightly inclined downwardly, as shown at 49 and 50 respectively. A plurality of cylindrical recesses 51 are formed within the member 44 and are spaced equi-distant from each other. A plurality of openings 52 are disposed through member 45; and these, too, are spaced equi-distant from each other. Each recess 51 has a roller bearing 53 snugly fitted therein.

A shaft 54 passes through each of the openings 52 as well as through each of the roller bearings 53 (the inner race of which is secured to the shaft) and, also, through openings 55 disposed through the member 44. Fixedly secured to each of the shafts is a case hardened steel roller 57. Each roller is tapered downwardly so that the periphery at its top is greater than the periphery at its base, and the degree of its taper is proportional to the degree of inclination of the inner face 18 of the die 29. The position of each roller 57 with respect to the inner face of the die is such that little space exists between the two peripherel surfaces. Secured to the upper end of each shaft 54 is still another roller bearing 58, each of which is protected and secured in place by cover 59. Cover 59 is secured in any conventional manner to the member 45. Secured to the lower end of each of the shafts 54 is a beveled pinion 60 which engages and meshes with the teeth of internal bevel gear 22. Because the rollers are positioned equi-distant from each other and have the same radius, no part of the supports 44 and 45 are subjected to an abnormal strain. This assures a smooth and relatively quiet operation, lessens the amount of power necessary to operate the machine and eliminates undue wear upon the operating parts of the machine.

Each of the rollers is detachable, thus permitting the replacement of the rollers when such replacement is necessary, or rollers of different inclined peripheral surfaces may be substituted when desired.

Figure 10:
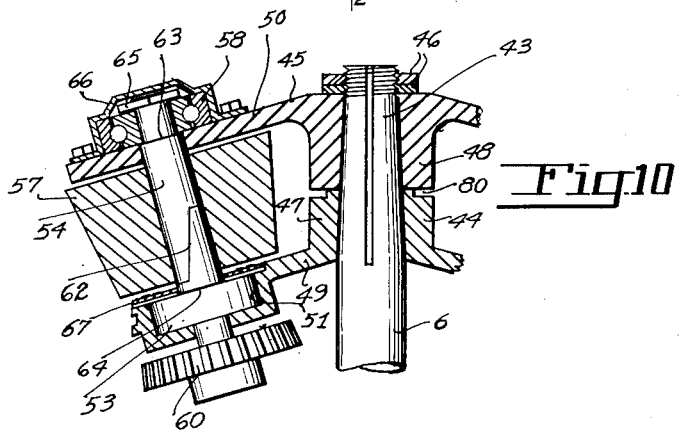
Figure 10 is a fragmentary, sectional, side view of a roller assembly, slightly modified in construction, but embodying the principles of my invention.

The preferred construction of each roller assembly has already been described, but there is shown in Figure 10 a modified form of construction which permits the removal of the roller supporting member 45 without the necessity of also removing the roller supporting member 44. To do so, it is necessary to split the roller supporting shaft 54, as shown at 62. The shaft is shouldered, as shown at 63 and 64. Roller 57 is held securely against the upper portion of the split shaft 54 and is free from the lower portion of the same shaft, but because of the elongated split of the shaft, as shown at 62, rotation is imparted from the lower split portion of the shaft to the upper split portion of the shaft 54. In order to prevent the upper portion of the split shaft 54 from falling from its position with respect to the roller bearing 58, a threaded nut 65 is threadably secured to the top of the shaft. This necessitates a slightly modified cover 66, which not only covers the roller bearing, but, also, the threaded nut, but functions in all other respects in the same manner as the cover 59. By this construction, it is apparent that the roller supporting member 45 may be raised without raising the roller supporting member 44. An annular packing plate 67 is positioned with respect to member 44, so that each of the bearings 53 is protected against the intrusion of foreign matter.

I have withheld pointing out an important relationship which exists between the die and the rollers until the details of construction of the rollers and die have been recited. It is now desirable to point out that the tapering of the die and the rollers not only permits the conglomerate mass to be engaged by the respective peripheral surfaces of the die and rollers without slippage occurring between them, but no slippage can occur even when the die is raised or lowered in order to adjust its inner face with respect to the peripheral surfaces of the rollers. That this is possible is due to the fact that the ratio between the inner face of the die and the peripheral surfaces of the rollers remains the same regardless of the raising or lowering of the die.

To insure against the entrance of foreign matter between the member 44 and the supporting block 16, a sealing ring 68 is provided. The construction of the ring is best shown in Figure 9. An annular inclined flange 69 extends from the sealing ring 68 and is positioned upon the inclined flange 27 of die supporting member 23. This may best be seen in Figure 7. Disposed at intervals within the sealing ring 68 are a plurality of ring retaining ears 70 which fit intimately against the underside of the inclined flange 27. Since, by this arrangement, the sealing ring is forced to move up or down with the movement of the die supporting member 23 and since it is not desirable to have this sealing ring revolve, there is formed within the sealing ring a plurality of slots 71 into each of which is fitted a pin 72. The pin, also, extends into the member 44. By this means, while the sealing ring is restrained from revolving; it is capable of moving up or down with the raising or lowering of the die retaining member 23. A number of ears 73 are formed within and inclined upwardly from the flange 69, as shown in Figure 9. These ears function to remove any material which may accumulate at the lower portion of the die 29. It is well to bear in mind that the position of the ears 73 with respect to the sealing ring 69 is such as to permit their placement against the die just immediately in front of each of the rollers 57, so that there is no possibility of an accumulation of material at the lower portion of the die which would interfere with the normal operation of each of the rollers. A packing ring 68A is disposed between the sealing ring 68 and the outer periphery of the member 44. By the above described construction an oil well relatively free from the possibility of contamination is provided in which the pinion gears 60 and internal bevel ring gear 22 are disposed.

Figure 5:
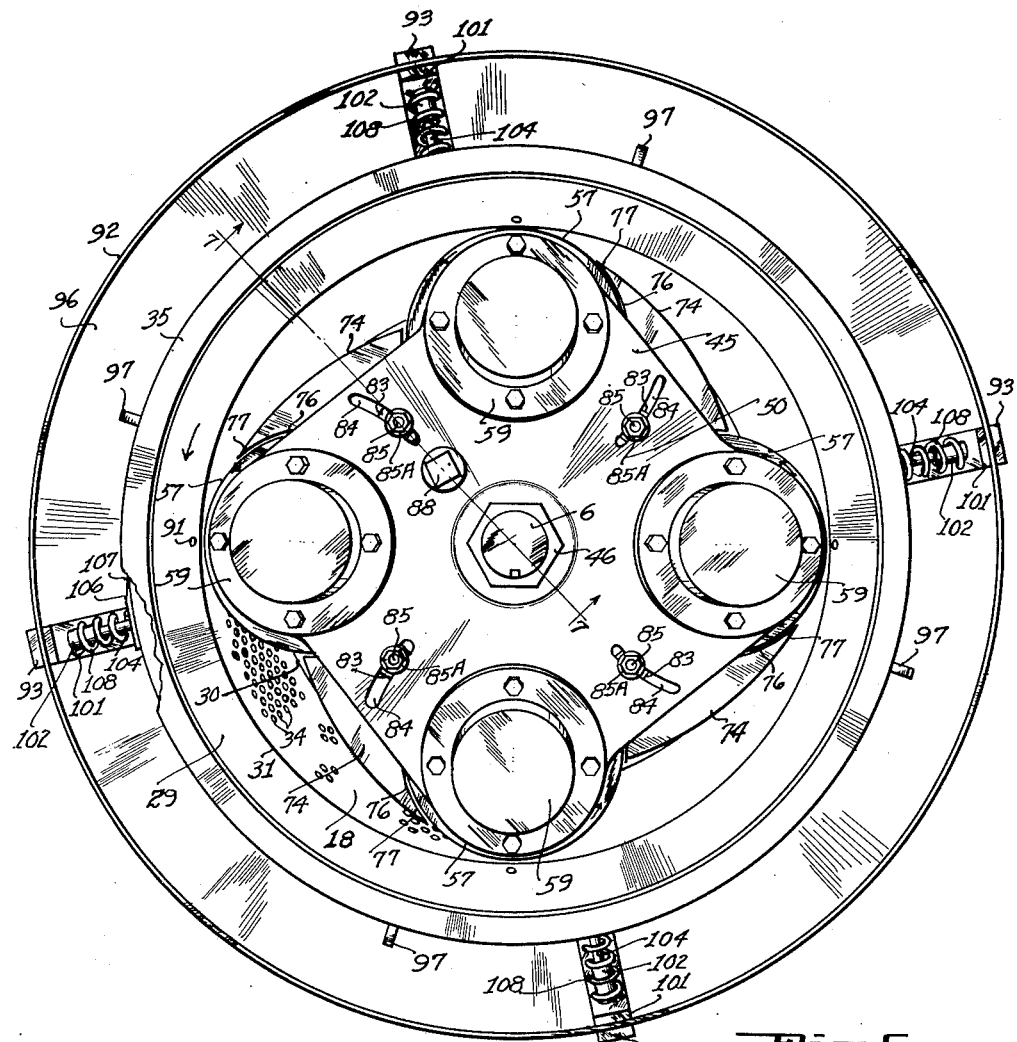
Figure 5 is a top view of the machine shown in Figure 2 with a small portion of the die reinforcing ring broken away to show the position which the cutting edge of one of the cutting members assumes with respect to the die.

A plurality of feeder shoes 72, the construction of which are best shown in Figures 5, 7 and 8, are adjustably secured to the roller supporting member 45 and are positioned with respect to the rollers as to place one feeder shoe between two rollers. Each feeder shoe 74 has an inclined wall 75 which extends downwardly the full length of the rollers. The curvature of edge 76 of each shoe is such as to coincide with the curvature of the upper periphery of each of the rollers so that the end 77 of wall 75 lies extremely close to the tapered surface of the roller. The wall 75 is, also, curved, and its curvature is substantially identical to the curvature of the inner face 18 of the die 29. By reason of the shape and contour of each feeder shoe as heretofore described, a wedge shaped receiving well 78 is formed between the inner face 18 of the die 29, the wall 75 of the feeder shoe and the tapered surface of the respective feed rollers between which each feeder shoe is disposed.

It is oftentimes necessary and desirable to vary the size of wells 78, but it is, also, essential that the size of each well be identical so that the material fed into the wells will receive substantially the same pressure during the processing in order that feeds of uniform density may be manufactured. To accomplish this desirable function, a common adjusting means is provided. The adjusting means consists of a gear ring 79 which is rotatably disposed between the hubs 47 and 48 of members 44 and 45 and within an annular recess 80 formed within the end of hub 48. A plurality of links 81 are secured to and positioned adjacent the teeth of the gear ring 79. The other end of each of the links 81 is hingedly secured to brackets 82, one bracket extending from the inside surface of wall 75 of each of the feeder shoes 74. An arcuate lug 83 extends upwardly from the top of each feeder shoe 74, and complementary arcuate slots 84, having the same curvature as the lugs 83, but longer, are disposed through member 45. A threaded member 85 extends upwardly from each lug 83 and passes through slots 84 and a nut 85A is threaded about member 85 and is adapted to restrain each of the feeder shoes 74 from movement with respect to the member 45 when tightly positioned with respect to the top of member 45. To simultaneously adjust these feeder shoes, a shaft 86, shown in Figure 7, is journaled to and extends through member 45 and has pinion 87 secured to one end, the teeth of which mesh at all times with the teeth of gear wheel 79. A nut 88 is formed upon the top of shaft 86. The simultaneous adjustment of the feeder shoes 74 may be accomplished by moving threaded member 85 sufficiently to release the pressure and permit lugs 83 to ride freely in slots 84; then, turning nut 88 so that rotation is imparted through pinion 87 to gear wheel 79. Since each shoe 74 is joined to the gear wheel 79 by links 81, the shoes may be moved inwardly or outwardly, and after the desired adjustment has been made, the threaded nuts 85A again hold the lugs 83 tightly in slots 84 so that the feeder shoes 74 are held firmly against the member 45.

Several other elements, which are necessary to produce a complete working machine have not yet been described, one of which is the cylindrical tapered guard 89 which surrounds the roller retaining members 44 and 45 which is removably positioned with respect to the top of die 29 by having secured thereto retaining pins 90 that fit into openings 91 formed within the top of said die. This guard not only prevents the material being processed from overflowing, but functions to divert the conglomerate mass as it is being delivered into the receiving wells 78, by the feed dividing member yet to be described. Secured in any well known manner to the frame 1 is an inclined trough 92 which surrounds the die 29, the die supporting member 23 and the supporting block 16 and is disposed in spaced relationship with each of them. The trough 92 is reinforced at intervals by reinforcing brackets 93 which, also, function to support the stripping members, not yet described. The trough 92 has a flat base 94 in which are disposed a plurality of openings 95. The trough, also, has an inclined wall 96, the inclination of which is identical to the inclination of the inner and outer faces 18 and 36 respectively. Secured at intervals on the side of supporting block 16 in any desirable manner are a plurality of sweeper arms 97, the base 98 of which lies adjacent the base 94 of the trough 92 and the end 99 of which is tapered, so that its degree of taper is identical to the inclination of wall 96 of trough 92. It immediately becomes apparent that, when the supporting block 16 is rotated, the sweeper arms 97 are made to revolve within the trough 92, so that any material which falls upon the base 94 is immediately engaged by the sweeper arms 97 and is directed toward the nearest opening 95; and, since a discharge chute 100 (one of which is shown in Figure 1) is secured to the base 94 of trough 92 with its opening coinciding with the opening 95, the processed material is taken from the machine and delivered to any central receiving station.

Figure 6:
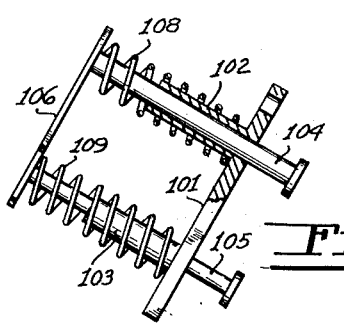
Figure 6 is a side view, partially in section, of one of the cutting members showing the constructional details.

Stripping members, the details of construction of which are best shown in Figure 6, are secured to wall 96 of trough 92. These function to strip and remove the material as it is extruded in a molded state through the passages 34 in die 29. Since each stripping member is identical in construction, the description of one will suffice. A plate 101, removably secured to the wall 96 and located in front of the reinforcing bracket 93, has a pair of hubs 102 and 103 extending outwardly therefrom in spaced parallel relationship to each other. Disposed through each reinforcing bracket 93 and through hubs 102 and 103, are a pair of knife supporting members 104 and 105. This best may be seen in Figure 1. The blade 106 of each of the stripping members has a sharpened edge 107, which is adapted to intimately engage with the outer face 36 of the die 29, as shown in Figure 5. Surrounding each hub is a tensioned spring 108 and 109, which engage against the back of the knife 106. This arrangement allows for the automatic adjustment of the stripping member with respect to the outer face 36 of die 29 and allows for the sharpened edge 107 of knife 106 to at all times contact the outer surface, regardless of the position of the die 29.

Figure 11:
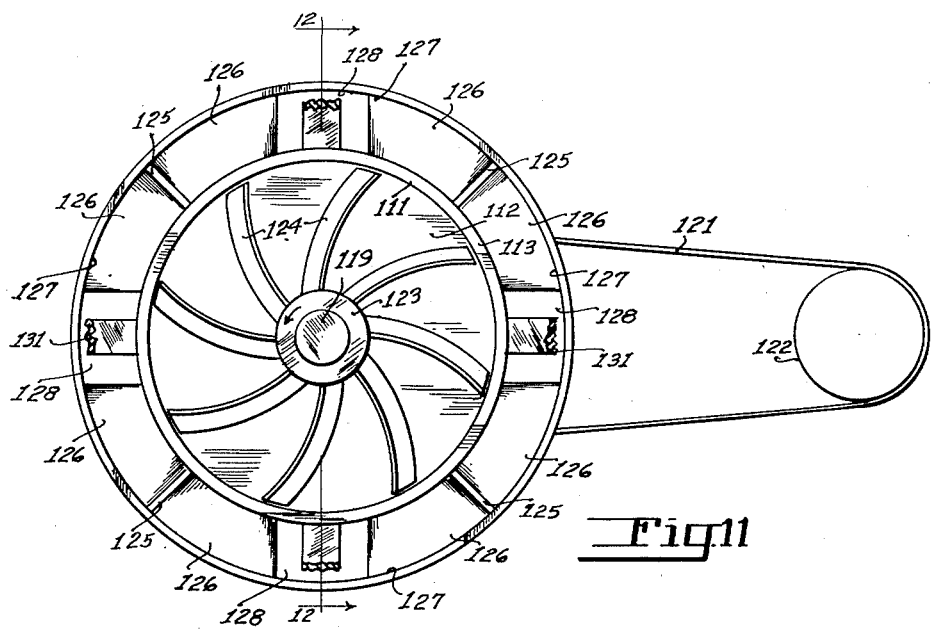
Figure 11 is a plan view of the feed dividing member shown in Figure 1 in position with respect to the machine.
Figure 12:
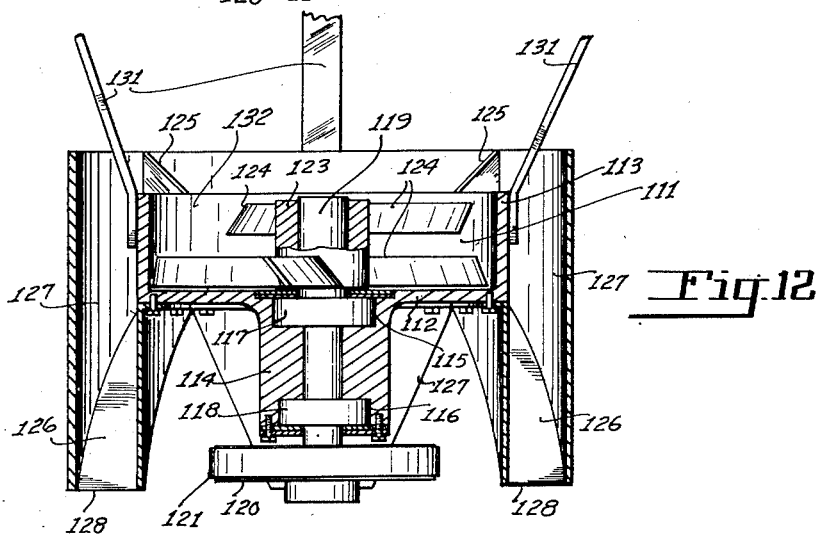
Figure 12 is a sectional, side view taken on line 12—12 of Figure 11 looking in the direction indicated showing the details of construction of the feed dividing member.

To insure uniform and continuous delivery of the conglomerate mass to be processed into the wells 78 of the machine, a feed dividing member is placed immediately below the main feeding chute 110. The details of construction of the feed dividing member are shown in Figures 11 and 12. It will be seen from Figure 12 that the feed dividing member consists of a main cylindrical frame 111 which possesses a base 112 and a side wall 113 which extends upwardly from the base. While the side wall 113 is shown in one piece, it may be made in two pieces telescopically positioned with respect to each other, so that the depth of the agitating chamber 132 may be increased or decreased to allow for adjustment in the amount of material which may be agitated over the top of the side wall 113. A hub 114 extends downwardly from the center of base 112. Roller bearing receiving recesses 115 and 116 are formed at the extreme ends of the hub 114 and disposed therein are roller bearings 117 and 118 respectively. The usual packings surround each roller bearing to prevent any foreign substance from working into the bearings. Passing through the base 112 and hub 114 is a shaft 119 which is surrounded by the bearings 117 and 118. The shaft 119 has secured to its lower end a pulley 20 around which a belt 121 passes. Power for driving the pulley 120 is derived from pulley 122 which transmits its rotation via the belt 121 to pulley 120. The drawings do not show the manner by which pulley 122 itself receives its rotary motion, but it is obvious that any power take-off will suffice for driving the pulleys. Connected to the other end of the shaft is a blade holding hub 123 which is secured to the shaft in any desirable manner so that, upon the rotation of the shaft 119, rotation will be imparted to the hub 123. A plurality of arcuate and tilted blades 124 are secured to and extend radially from the hub 123 and are equally spaced from each other, but are confined within the area surrounded by side wall 113. These blades are arranged about hub 123 so that every other blade is positioned adjacent the base 112 and every other blade adjacent to top of hub 123, thus placing an equal number of blades 124 in different horizontal planes. The radial position of the blades may best be seen in Figure 11, and the position of blades in different horizontal planes may best be seen in Figure 12.

A multi-chambered cylindrical casing surrounds the cylindrical frame 111 and is secured to base 112 thereof in any conventional manner. The wall of the casing is higher than side wall 113. This casing has a plurality of partitions 125 to which the downwardly inclined members 126 are secured. These members are inclined downwardly and in opposite direction from each other, forming chambers 127 between the partitions 125, that direct the material toward openings 128 formed at the base thereof. Secured to the base of each chamber 127 and in registerable alignment with each opening 128, is a delivery chute 129, the end 130 of which rests upon the top of member 45 and is disposed thereupon, so that its end 130 is in position to deliver the material to be processed within wells 78. The feed dividing member is secured to the main feeding chute 110 by conventional supports 131.

From the above arrangement, it may be seen that, as the conglomerate mass to be processed enters into the agitating chamber 132, in which the blades 124 rotate, these blades not only engage the material and direct it toward the side wall 113, but lift the material over the top of the wall 113 in substantially uniform proportions. The material, as it passes over the side wall 113, enters chambers 128 and then passes, through delivery chutes 129, into the wedge shaped spaces 78.

Having described the details of construction of each of the elements combined to form the machine embodying the principles of my invention, it is believed advisable to recite in general terms the mode of operation of the machine heretofore described.

*Modus operandi*

Any conglomerate mass desired to be processed is fed through the main chute into the agitating chamber in which the blades of the feed dividing member rotate. The blades act upon the mass and cause it to be delivered into the delivery chutes in substantially uniform proportions. The conglomerate mass is then fed into the wedge shaped space between the die and feeder shoes and, because of the contour and position of the feeder shoes with respect to the die, and of the contour of the die itself, is immediately directed toward the rollers. As the mass is so directed, a slight compression is effected upon it. When the conglomerate mass finds itself between the outer surface of the rollers and the inner surface of the die, it is squeezed therebetween and forced into the passages formed through the die. Since this action is continuous, the material forced into the passages eventually is extruded therethrough in a molded condition. Because of the uniform delivery of the conglomerate mass into the machine, the uniform adjustment of the feeder shoes with respect to the inner face of the die and the rollers and the uniform spacing of the rollers with respect to themselves and the die, the machine operates upon the mass at a substantially uniform pressure, so that the resulting product, when it emanates in a molded state, possesses a uniform density, much desired in the production of commercial feeds. As the molded ribbons emanate from the passages of the die, the stationary stripping members cut the material into pellets of uniform size. This is possible because the position of the stripping members is slightly in rear of with respect to the rollers, as graphically shown in Figure 5. The arrow on the die in Figure 5 indicates the direction in which the die moves and the rollers, also, rotate in the same direction. It is, also, well to point out that the mass as it is being directed toward the rollers by the feeder shoes, is prevented from packing at the base of the die. This is possible because of the contours of the feeder shoes and die.

While, in the foregoing description, the invention is set forth as particularly adapted for the manufacture of pellets, it will be obvious to those skilled in the art that the invention is adapted for the manufacture of feeds possessing other shapes and characteristics.

Furthermore, while the invention has been illustrated and described, as taking one particular form, it is to be understood that the invention is not so limited, but is susceptible of various changes and modifications in structure and in the mode of operation without departing from the spirit thereof. Hence, I do not limit myself to the precise construction set forth; and I desire, therefore, that only such limitations shall be placed thereupon as are imposed by and specifically set forth in the appended claims.

Having thus described my invention, what I claim as new and desire to secure by Letters Patent, is:

1. In a feed forming machine of the character described, a frame, a supporting spider disposed within the frame, a shaft fixedly secured to and extending upwardly from said supporting spider, a supporting block rotatably disposed about said shaft, an annular die supporting member adjustably secured to and positioned upon said supporting block, means connected to the supporting block and to the die supporting member for effecting said adjustment, a tapered cylindrical die fixedly disposed upon said die supporting member, means for revolving said supporting block, a pair of roller supporting members fixedly disposed upon said shaft, a plurality of tapered rollers rotatably disposed between said roller supporting members and spaced equi-distant from each other, so that their respective peripheral surfaces are adjacent the inner face of said die, means for imparting rotation to each of the rollers, a plurality of equally spaced feeder shoes adjustably secured to one of the roller supporting members, said feeder shoes adapted to direct the material being processed toward the die, so that it is engaged by the rollers and forced through the passages in the die, means for simultaneously moving all of the feeder shoes when desired, and means for feeding a uniformly proportioned amount of material to be processed between said rollers and said feeder shoes.

2. In a machine for the continuous processing of a conglomerate mass, a frame, a shaft extending upwardly from the center of said frame, a supporting block disposed about said shaft and adapted for rotation therearound, a die supporting member disposed upon said supporting block, means for raising or lowering said die supporting member with respect to said supporting block, a die disposed upon said die supporting member, means for rotating the supporting block, a plurality of rollers disposed in operative relationship to the inner face of said die, means secured to said shaft for supporting said rollers, and feeder shoes disposed between the rollers adapted for directing the materials to be processed between the peripheral surfaces of the rollers and the inner face of the die.

3. In a machine for the continuous processing of a conglomerate mass, a frame, a shaft extending upwardly from the center of said frame, a supporting block disposed about said shaft and adapted for rotation therearound, a die supporting member disposed upon said supporting block, means for raising or lowering said die supporting member with respect to said supporting block, a die disposed upon said die supporting member, means for rotating the supporting block, a plurality of rollers disposed in operative relation to the inner face of said die, means secured to said shaft for supporting said rollers, feeder shoes disposed between the rollers adapted for directing the materials to be processed between the outer faces of the rollers and the inner face of the die, and means for the simultaneous adjustment of said feeder shoes.

4. In a feed forming machine of the character described, a tapered ring die, supports for said die, means for revolving said supports and die, means for permitting the vertical adjustment of said die with respect to said supports, rollers disposed within the area confined by the tapered ring die, means for supporting said rollers, said means being fixedly positioned with respect to said die and said rollers, and means for rotating said rollers.

5. In a feed forming machine of the character described, a tapered ring die, supports for said die, means for revolving said supports and said die means for permitting the vertical adjustment of said die with respect to said supports, rollers disposed within the area confined by the tapered ring die, means for supporting said rollers, said means being fixedly positioned with respect to said die and said rollers, means for rotating said rollers, means for directing the materials being processed toward the rollers, and means for simultaneously adjusting said last mentioned means.

6. A feed forming machine of the type having a tapered cylindrical die, a support for said die, means associated with said support for raising and lowering the die with respect thereto, means for revolving said support, a plurality of rollers possessing tapers complementary to the taper of the die disposed in operative relation to the inner face of said die, means for supporting said rollers, means for rotating said rollers and means for directing the material to be processed toward said rollers.

7. In a feed forming machine of the character described, a tapered ring die, a multi-cammed die supporting member secured to said die, a supporting block having camming surfaces complementary to the cams formed in the multi-cammed die member and to the supporting block whereby vertical adjustment of the die may be effected, and means for revolving said supports and die.

8. In a feed forming machine of the character described, a frame, a supporting spider disposed within the frame, a shaft fixedly secured to and extending upwardly from said supporting spider, a supporting block rotatably disposed about said shaft, an annular die supporting member adjustably secured to and positioned upon said supporting block, means connected to the supporting block and to the die supporting member for effecting said adjustment, a tapered cylindrical die fixedly disposed upon said die supporting member, means for revolving said supporting block, a pair of roller supporting members fixedly disposed upon said shaft, and a plurality of tapered rollers rotatably disposed between said roller supporting members and spaced equidistant from each other so that their respective peripheral surfaces are adjacent the inner face of said die.

9. In a feed forming machine of the character described, a frame, a supporting spider disposed within the frame, a shaft fixedly secured to and extending upwardly from said supporting spider, a supporting block rotatably disposed about said shaft, an annular die supporting member adjustably secured to and positioned upon said supporting block, means connected to the supporting block and to the die supporting member for effecting said adjustment, a tapered cylindrical die fixedly disposed upon said die supporting member, means for revolving said supporting block, a pair of roller supporting members fixedly disposed upon said shaft, a plurality of tapered rollers rotatably disposed between said roller supporting members and spaced equi-distant from each other so that their respective peripheral surfaces are adjacent the inner face of said die, means for imparting rotation to each of the rollers, and a plurality of feeder shoes adjustably secured to one of the roller supporting members, said feeder shoes adapted to direct the material being processed so that it will be engaged by the rollers and forced through the passages in the die.

10. In a feed forming machine of the character described, a frame, a supporting spider disposed within the frame, a shaft fixedly secured to and extending upwardly from said supporting spider, a supporting block rotatably disposed about said shaft, an annular die supporting member adjustably secured to and positioned upon said supporting block, means connected to the supporting block and to the die supporting member for effecting said adjustment, a tapered cylindrical die fixedly disposed upon said shaft, a plurality of tapered rollers rotatably disposed between said roller supporting members and spaced equi-distant from each other, so that their respective peripheral surfaces are adjacent the inner face of said die, a plurality of feeder shoes adjustably secured to one of the roller supporting members, said feeder shoes adapted to direct the material being processed so that it is engaged by the rollers and forced through the passages in the die, and means for simultaneously moving all of the feeder shoes when desired.

11. In a feed forming machine of the character described, a frame, a supporting spider disposed within the frame, a shaft fixedly secured to and extending upwardly from said supporting spider, a supporting block rotatably disposed about said shaft, an annular die supporting member adjustably secured to and positioned upon said supporting block, means connected to the supporting block and to the die supporting member for effecting said adjustment, a tapered cylindrical die fixedly disposed upon said die supporting member, means for revolving said supporting block, a pair of roller supporting members fixedly disposed upon said shaft, a plurality of tapered rollers rotatably disposed between said roller supporting members and spaced equi-distant from each other so that their respective peripheral surfaces are adjacent the inner face of said die, means for imparting rotation to each of the rollers, a plurality of feeder shoes adjustably secured to one of the roller supporting members, said feeder shoes adapted to direct the material being processed so that it will be engaged by the rollers and forced through the passages in the die, and means for feeding a uniformly proportioned amount of the material to be processed between said rollers and said feeder shoes.

12. In a feed forming machine of the character described, a frame having a supporting spider, the hub of which has a tapered bore, a shaft, having a partially threaded tapered end, is disposed within said tapered bore and extends upwardly in vertical position with relation to the spider, a main supporting member supported by and adapted to revolve about said shaft as an axis, means for rotating said block, a die supporting member adjustably positioned upon the supporting block, means for effecting the desired adjustment betwen said block and said die supporting member, and a tapered die ring disposed upon the die supporting member.

13. In a feed forming machine of the character described, a tapered ring die, a multi-cammed die supporting member secured to said die, a supporting block having camming surfaces complementary to the cams formed in the multi-cammed die supporting member, means operatively joined to the multi-cammed member and to the supporting block whereby vertical adjustment of the die may be effected, means for revolving said supports and die, rollers disposed within the area confined by the tapered ring die, and means for supporting said rollers, said means being fixedly positioned with respect to said die and said rollers.

14. A feed forming machine of the type having a tapered cylindrical die, a support for said die, means associated with said support for raising and lowering the die, means for revolving said support, a plurality of rollers possessing tapers complementary to the taper of the die disposed in operative relation to the inner face of said die, means for supporting said rollers, a plurality of feeder shoes adapted to direct the material being processed toward the die, and means for permitting the simultaneous adjustment of said feeder shoes.

15. In a feed forming machine of the character described, a tapered cylindrical die, a support for said die, means for revolving said support, a plurality of rollers each possessing a taper complementary to the taper of the die and each of said rollers positioned so that its outer face lies contiguous to the inner face of the die adapted to force the material being processed through said die, and means for supporting said rollers.

16. In combination with a feed forming machine of the cylindrical die type, of a plurality of feeder shoes adapted to direct the material being processed toward the die, means for holding each of the feeder shoes against movement when desired, and means for simultaneously adjusting all of the feeder shoes when desired.

17. A die member to be used with a feed forming machine of the class described comprising, an annular ring having a plurality of perforations disposed radially in spaced relationship and positioned at right angles to the faces of said ring, said annular ring being tapered so that its base is smaller in area than its top, thereby providing an inner face which is inclined outwardly when said die is viewed in relation to the machine with which it is used.

18. A die member to be used with a feed forming machine of the class described comprising, an annular ring having a plurality of perforations disposed radially in spaced relationship and positioned at right angles to the faces of said ring, said annular ring being tapered so that its base is smaller in area than its top, thereby providing an inner face which is inclined outwardly when said die is viewed in relation to the machine with which it is used, the base of said die having a stepped inclined surface, and an annular collar removably disposed upon the top of and adapted to reenforce said die.

CLAUDE C. HALL.